United States Patent
Lee

(10) Patent No.: US 6,793,729 B2
(45) Date of Patent: Sep. 21, 2004

(54) CONDUCTIVE MATERIAL FOR USE IN INTERIOR COATING OF CATHODE RAY TUBE

(75) Inventor: Chang-Hun Lee, Seoul (KR)

(73) Assignee: Eui-Kyun Jeong, Gangwon-Do (KR)

( * ) Notice: Subject to any disclaimer, the term of this patent is extended or adjusted under 35 U.S.C. 154(b) by 272 days.

(21) Appl. No.: 09/974,407

(22) Filed: Oct. 9, 2001

(65) Prior Publication Data

US 2003/0001487 A1 Jan. 2, 2003

(30) Foreign Application Priority Data

Mar. 28, 2001 (KR) ........................................ 2001-16165

(51) Int. Cl.$^7$ .......................... C04B 12/04; C04B 14/02; C04B 14/30; C04B 14/32; H01J 29/88

(52) U.S. Cl. ....................... 106/600; 106/618; 106/626; 106/634; 106/635; 313/479

(58) Field of Search ................................ 106/600, 618, 106/626, 634, 635; 313/479

(56) References Cited

U.S. PATENT DOCUMENTS

| | | | | |
|---|---|---|---|---|
| 4,041,347 A | * | 8/1977 | Deal et al. | 313/450 |
| 4,052,641 A | * | 10/1977 | Dominick et al. | 313/450 |
| 5,575,953 A | * | 11/1996 | Tachizono et al. | 252/504 |

* cited by examiner

Primary Examiner—David Brunsman
(74) Attorney, Agent, or Firm—Knobbe Martens Olson & Bear LLP

(57) ABSTRACT

A conductive material for use in interior coating of a cathode ray tube (CRT), which includes an aqueous dispersion medium containing potassium silicate and a dispersing agent; and graphite particles. The potassium silicate of the aqueous dispersion medium has a silicon dioxide ($SiO_2$) to potassium oxide ($K_2O$) mole ratio in the range of 4.5:1 to 6:1, and is prepared by adding hydrosilica gel to a potassium silicate aqueous solution having a $SiO_2$ to $K_2O$ mole ratio less than 4.5:1. When the conductive material, which uses potassium silicate dispersed in an aqueous dispersion medium with a $SiO_2$:$K_2O$ mole ratio in the range of 4.5:1 to 6:1, as a binder, is applied to form a conductive layer on the funnel of a CRT, adhesiveness of the conductive layer markedly increases. Use of the potassium silicate as a binder decreases the amount of gas released during a hot-evacuation process, and thus shortens evacuation time.

26 Claims, No Drawings

CONDUCTIVE MATERIAL FOR USE IN INTERIOR COATING OF CATHODE RAY TUBE

BACKGROUND OF THE INVENTION

The present invention relates to a conductive material for using in interior coating of a cathode ray tube (CRT), and more particularly, to a conductive material for using in coating a conductive layer on the inner surface of the funnel of a CRT with increased adhesiveness.

CRTs have conductive layers, which serve as an electric condenser, on the outer and inner surfaces of the funnel. The conductive layers formed of a conductive material accelerate electron beams towards a phosphor screen at a high voltage, and gather secondary electrons emitted from the shadow mask, magnetic shield, and phosphor screen.

The conductive material used to form the conductive layers includes graphite, a binder, and a dispersing agent. The conductive material further include a metal oxide to increase elastic resistance. A conductive layer formed of the conductive material, and a CRT adopting the conductive layer are obtained as follows. The conductive material is coated on the inner or outer surface of a funnel by a spraying or deposition technique, or by means of a brush or sponge. The coated conductive layer is dried and sintered in the air. The funnel having the conductive layer and a panel having a phosphor screen on its inner surface are sealed at a temperature of about 450° C. using a glass having a low melting point. An electron gun which emits electron beams is equipped into the neck portion of the funnel, and the resultant structure is hot evacuated to complete a vacuum CRT.

Since the conductive layer coated on the inner surface of the funnel of a CRT adsorbs moisture and a variety of gases in the air, the adsorbed gases are removed from the conductive layer by hot evacuation before sealing of the CRT. However, although such evacuation is carried out, the adsorbed gas which still remains in the conductive layer is released during operation of the CRT, which causes undesirable reactions with the cathode of the CRT, thereby degrading the cathode.

On the other hand, the conductive layer may partially laminate from the inner surface of the funnel in the manufacture of a CRT. As a result, arc discharging of the electron gun, or current leakage occurs during operation of the CRT. Such arc discharging or current leakage damages high-voltage stability of the CRT. For this reason, there is a need to form a conductive layer such that the conductive layer remains intact on the funnel against external vibration or impact.

Japanese Patent Laid-open Publication No. sho 55-2042; hei 3-59542; and sho 63-45428 disclose use of a metal oxide formed of iron (Fe), titanium (Ti), cobalt (Co), nickel (Ni), chromium (Cr), manganese (Mn), aluminum (Al), or silicon (Si) as an additive to a conductive material for the conductive layer of a CRT. Japanese Patent Laid-open Publication No. 63-45428 discloses a method of uniformly dispersing negatively and positively charged particles in a negatively charged dispersion medium, in which negatively charged graphite particles and positively charged metal oxide particles such as titanium dioxide ($TiO_2$) are agglomerated together, and negatively charged silicon dioxide ($SiO_2$) particles are dispersed around the particle complex.

Japanese Patent Laid-open Publication No. sho 61-20990 discloses a method of increasing adhesiveness of the conductive layer formed on the inner side of a CRT funnel by addition of silicon carbide particles as well as graphite particles. U.S. Pat. No. 4,479,824 discloses use of a silicon monomer as well as graphite particles to suppress separation of the conductive layer from a CRT funnel.

Japanese Patent Laid-open Publication No. sho 52-52362 and sho 63-45428 disclose use of lithium silicate, potassium silicate, or sodium silicate as a binder of conductive layer. Japanese Patent Laid-open Publication No. hei 3-141539 discloses use of a cement, which less adsorbs moisture or gases, as a binder of a conductive layer. Japanese Patent Laid-open Publication No. sho 63-114025 discloses addition of a metal hydride which can adsorb and desorb gases to a conductive material of conductive layer. Japanese Patent Application No. hei 6-093079 discloses use of potassium silicate, which less adsorbs moisture or gases, as a binder of conductive layer.

The conductive layers formed by the above-described methods are unsatisfactory, and need an improvement in terms of adhesiveness to the inner surface of the funnel. In addition, in the case where the conductive layers are left in the air after sintering, there is a need to extend a period of time for which hot evacuation is performed to exhaust the adsorbed moisture or carbonic acid gas, which lowers productivity of CRTs.

SUMMARY OF THE INVENTION

An aspect of the present invention provides an adhesive composition comprising potassium silicate dissolved in water, wherein the potassium silicate comprises silicon dioxide and potassium oxide with a mole ratio of the silicon dioxide to the potassium oxide greater than about 5.0, wherein the composition is in a liquid phase, and wherein the composition has adhesiveness of 3B 5B tested under ASTM D3359. The adhesiveness is preferably 4B to 5B. The adhesive composition further comprises a dispersing agent, which comprises at least one selected from the group consisting of carboxymethylcellulose (CMC), acryl and ethylene glycol. The adhesive composition further comprises a conductor, which comprises at least one selected from the group consisting of graphite and carbon black. The conductor advantageously comprises 20 to 80 parts-by-weight of graphite with reference to 100 parts-by-weight of a total amount of the conductive referenced material. The mole ratio of the silicon dioxide to the potassium oxide preferably ranges from about 5.0 to about 6.0, more preferably from about 5.0 to about 5.3.

Another aspect of the present invention provides a method of making a cathode ray tube. The method comprises: providing the above adhesive composition; adding a conductor to the composition; and applying the composition onto an interior surface of a cathode ray tube. In the method, the application of the composition comprises spraying the composition on the interior surface of the cathode ray tube. The method further comprises sintering the cathode ray tube after applying the composition.

A further aspect of the present invention provides a method of preparing a liquid composition comprising silicon dioxide and potassium oxide. The method comprises: providing an aqueous solution of potassium silicate comprising silicon dioxide and potassium oxide; stirring the aqueous solution with a stirrer at a rotational speed ranged from about 500 rpm to about 5,000 rpm; adding hydrosilica gel to the aqueous solution while stirring so that the mole ratio increases beyond about 4.5 without resulting in gelation of the composition. The aqueous solution before adding hydrosilica gel has a mole ratio of the silicon dioxide to the potassium oxide smaller than about 4.5. Preferably, the mole ratio before adding hydrosilica gel is from about 1.0 to about 4.0, more preferably from about 2.0 to about 3.5. When adding the hydrosilica gel the aqueous solution is advantageously at a temperature from about 40° C. to about 100° C. Preferably, the temperature is from about 55° C. to about 85° C., more preferably, from about 65° C. to about 75° C. The rotational speed is from about 900 rpm to about 4,000 rpm. Preferably, the rotational speed is from about 1,100 rpm to about 3,500 rpm. The addition of the hydrosilica gel comprises continuously feeding the hydrosilica gel. The method further comprises adding a dispersing agent. The method further comprises adding a conductor, which comprises at least one selected from the group consisting of graphite and carbon black. The conductor comprises 20 to 80 parts-by-weight of graphite with reference to 100 parts-by-weight of a total amount of the conductive material. The method further comprises a metallic compound, which is selected from the group consisting of indium tin oxide(ITO), tin oxide($SnO_2$), zinc oxide (ZnO), copper oxide(CuO), cobalt oxide(CoO), nickel oxide(NiO), chromium(Cr), chromium trioxide($CrO_3$), manganese oxide(MnO), magnesium oxide (MgO), aluminum oxide($Al_2O_3$), titanium oxide($TiO_2$), silicon carbide(SiC), ferric oxide ($Fe_2O_3$) and mixtures thereof.

A further aspect of the present invention provides a cathode ray tube comprising an interior surface coated with a composition comprising potassium silicate and a conductor, wherein the potassium silicate comprises silicon dioxide and potassium oxide with a mole ratio of the silicon dioxide to the potassium oxide greater than about 5.0. The he mole ratio is from about 5.0 to about 6.0. The conductor comprises graphite in an amount of 20 to 80 parts-by-weight with reference to a total amount of the conductive material.

A still further aspect of the present invention provides a composition comprising potassium silicate dissolved in water, wherein the composition has adhesiveness of 3B to 5B tested under ASTM D3359, and wherein the composition is produced by a process comprising: providing an aqueous solution of potassium silicate comprising silicon dioxide and potassium oxide with a mole ratio of the silicon dioxide to the potassium oxide smaller than about 4.5; and mixing hydrosilica gel with the aqueous solution, so that the mole ratio increases beyond about 4.5 without resulting in gelation of the composition. The process further comprises stirring the aqueous solution at a rotational speed ranged from about 500 rpm to about 5,000 rpm. The mixing comprises adding the hydrosilica gel to the aqueous solution while being stirred. The process further comprises heating the aqueous solution to a temperature ranged from about 40° C. to about 100° C. The composition produced by the process further comprises a conductor, which is selected from the group consisting of graphite particles, carbon black and a mixture thereof.

The composition further comprises a metallic compound selected the group consisting of indium tin oxide(ITO), tin oxide($SnO_2$), zinc oxide (ZnO), copper oxide(CuO), cobalt oxide(CoO), nickel oxide(NiO), chromium(Cr), chromium trioxide($CrO_3$), manganese oxide(MnO), magnesium oxide (MgO), aluminum oxide($Al_2O_3$), titanium oxide($TiO_2$), silicon carbide(SiC), ferric oxide ($Fe_2O_3$) and mixtures thereof. The composition further comprises a dispersing agent selected from the group consisting of carboxymethylcellulose (CMC), acryl, ethylene glycol and mixtures thereof.

Still another aspect of the present invention provides a cathode ray tube comprising an interior surface and a conductive layer on at least part of the interior surface, wherein the conductive layer comprises the composition comprising potassium silicate dissolved in water, wherein the composition has adhesiveness of 3B to 5B tested under ASTM D3359, and wherein the composition is produced by a process comprising: providing an aqueous solution of potassium silicate comprising silicon dioxide and potassium oxide with a mole ratio of the silicon dioxide to the potassium oxide smaller than about 4.5; and mixing hydrosilica gel with the aqueous solution, so that the mole ratio increases beyond about 4.5 without resulting in gelation of the composition.

DESCRIPTION OF EMBODIMENTS OF THE INVENTION

A conductive material for use in interior coating of a cathode ray tube (CRT) according to the present invention is characterized in that potassium silicate having a silicon dioxide ($SiO_2$) to potassium oxide ($K_2O$) mole ratio in the range of 4.5:1 to 6:1. The potassium silicate is formed by adding a water-soluble hydrosilica gel to a potassium silicate aqueous solution having a $SiO_2$:$K_2O$ mole ratio less than 4.5:1. If the $SiO_2$:$K_2O$ mole ratio of the silica potassium exceeds 6:1, gelation of the conductive material occurs, so that adhesiveness of a conductive layer formed of the conductive material becomes poor. Meanwhile, if the $SiO_2$:$K_2O$ mole ratio is less than 4.5:1, a conductive layer formed of the conductive material adsorbs an excess of moisture and gases.

A potassium silicate aqueous solution having a $SiO_2$:$K_2O$ mole ratio less than 4.5:1 is commercially available as KASIL (from the Philadelphia Quartz Company) or OHKA SEAL (from Tokyo Ohka Kogyo Co., Ltd.). Hydrosilica gel is commercially available as PM (from the Philadelphia Quartz Company) or DARACLAR (from W. R. Grace Inc.).

The conductive material according to the present invention includes graphite particles, and an aqueous dispersion medium containing potassium silicate and a dispersing agent. A $SiO_2$:$K_2O$ mole ratio in the aqueous dispersion medium is in the range of 4.5:1 to 6:1. The potassium silicate whose $SiO_2$:$K_2O$ mole ratio is in the above range is formed by adding hydrosilica gel in a potassium silicate aqueous solution having a $SiO_2$:$K_2O$ mole ratio less than 4.5. This preparation of the potassium silicate is preferred in terms of adhesiveness of a conductive layer to be formed with the conductive layer.

Hydrosilica gel differs from colloidal silica in terms of their phase, water solubility, particles size, and the like, as shown in Table 1. Specifically, in preparation of a binder, the $SiO_2$:$K_2O$ mole ratio at which gelation is initiated is different between hydrosilica gel and colloidal silica. In particular, gelation of the hydrosilica gel is initiated at a $SiO_2$:$K_2O$ mole ratio greater than 6:1, whereas gelation of the colloidal silica is initiated at a $SiO_2$:$K_2O$ mole ratio greater than 5:1. Thus, when a potassium silicate having a $SiO_2$:$K_2O$ mole ratio greater than 5:1 is prepared with colloidal silica, and the potassium silicate is used as a binder of a conductive material, due to gelation of the conductive material, adhesiveness of a conductive layer formed of the conductive material becomes poor. Meanwhile, when a potassium silicate having a $SiO_2$:$K_2O$ mole ratio in the range of 4.5:1 to 5:1 is prepared with colloidal silica, moisture or gas adsorption by the conductive layer is unsatisfactory.

TABLE 1

Comparison of Colloidal Silica vs. Hydrosilica Gel

| Items | Colloidal Silica | 1. Hydrosilica Gel |
|---|---|---|
| Phase | milky-white colloid with ultra fine particles | white semitransparent powder with fine pores |
| Water Solubility | soluble in cold water and hot water (soluble) | soluble in hot water at 40° C. or higher in an alkaline condition (insoluble in deionized water) |
| Particles Size | 0.1–20 μm | 0.1–100 μm |
| pH | 3–11 | 2–8 |
| Specific Surface Area | 0.8 cm$^2$/g | 2 cm$^2$/g |
| Preparation Method | remove impurities from silica to form silica anhydride (sol), and adjust the pH and concentration of the silica sol | decompose sodium silicate with inorganic acid to solidify silica gel, and wash and dry the silica gel to remove impurities |
| Network Structure | 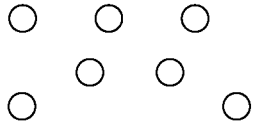 | 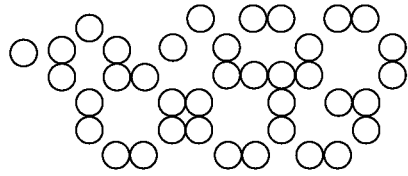 |
| Properties | gelation at the isoelectric point (i.e., at a pH of 11 or higher, in electrolyte having polyvalent metal ions) used as an agent which needs strong permeability (e.g., sealer) | used as an adsorptive (absorbent) |
| SiO$_2$:K$_2$O mole ratio of binder which initiates gelation | >5:1 (stable at a 5:1 or less) | >6:1 (stable at 6:1 or less) |

It is preferable that graphite particles of the conductive material have an average particle size of 0.5–20 μm, in terms of conductivity of the conductive layer. Preferably, the amount of graphite particles is in the range of 20–80 parts by weight, more preferably, 30–70 parts by weight, based on 100 parts by weight the total solids of the conductive material. If the amount of graphite particles is less than 20 parts by weight, conductivity of the conductive layer degrades. Meanwhile, if the amount of graphite particles exceeds 80 parts by weight, adhesiveness of the conductive layer becomes poor.

It is preferable that the amount of potassium silicate is in the range of 20–80 parts by weight, more preferably, in the range of 30–40 parts by weight, based on 100 parts by weight the total solids of the conductive material. If the amount of potassium silicate exceeds 80 parts by weight, the amount of graphite particles relatively decreases, so that conductivity of the conductive layer becomes poor. Meanwhile, if the amount of potassium silicate is less than 20 parts by weight, adhesiveness of the conductive layer is unsatisfactory.

Any dispersing agent can be used in the aqueous dispersion medium. In the present invention, carboxymethylcellulose (CMC) is used as a dispersing agent. The amount of dispersing agent is in the range of 1–3 parts by weight, more preferably, 2 parts by weight, based on 100 parts by weight the total solids of the conductive material. If the amount of dispersing agent is less than 1 part by weight, dispersion of each solid component in the aqueous dispersion medium becomes poor. Meanwhile, if the amount of dispersing agent exceeds 3 parts by weight, the amount of graphite particle and potassium silicate serving as a binder relatively decreases. This is undesirable.

The conductive material according to the present invention may further comprise a metal compound, as well as graphite particles and the aqueous dispersion medium containing potassium silicate and a dispersing agent. Addition of the metal compound slightly increases electric resistance. At least one metal compound selected from the group consisting of ferric oxide (Fe$_2$O$_3$), titanium dioxide (TiO$_2$), and silicon carbide (SiC) may be used. The amount of metal compound is in the range of 5–50 parts by weight, more preferably, 10–40 parts by weight, based on 100 parts by weight the total solids of the conductive material. If the amount of metal compound is less than 5 parts by weight, there is no resistance control effect. Meanwhile, if the amount of metal compound exceeds 50 parts by weight, resistance becomes too high.

In the case where a metal compound is further added to the conductive material, the amount of graphite particles is in the range of 15–50 parts by weight, preferably, 30–40 parts by weight, based on 100 parts by weight the total solids of the conductive material. The amount of potassium silicate is in the range of 20–50 parts by weight, preferably, 30–40 parts by weight, based on 100 parts by weight the total solids of the conductive material. The amount of dispersing agent is in the range of 1–3 parts by weight, preferably, about 2 parts by weight, based on the total solids of the conductive material.

A method of coating a conductive layer on the inner surface of a funnel of a CRT with the conductive material having the above composition will be described.

A potassium silicate aqueous solution having a $SiO_2:K_2O$ mole ratio in the range of 4.5:1 to 6:1, which serves as a binder, is prepared by adding hydrosilica gel to a potassium silicate aqueous solution having a $SiO_2:K_2O$ mole ratio less than 4.5:1.

Graphite particles, deionized water, and a dispersing agent are added to the potassium silicate aqueous solution whose $SiO_2:K_2O$ mole ratio is in the range of 4.5:1 to 6:1, and sufficiently mixed to form a conductive material according to the present invention. At least one metal compound selected from the group consisting of ferric oxide ($Fe_2O_3$), titanium dioxide ($TiO_2$), and silicon carbide (SiC) may be further added to the conductive material as needed.

The conductive material prepared by the above method is coated on the inner surface of the funnel of a CRT, dried, and sintered at a temperature of 400–470° C., preferable, at a temperature of 440–450° C., so that a conductive layer is formed on the inner surface of the funnel.

The present invention will be described in greater detail by means of the following examples. The following examples are for illustrative purposes and are not intended to limit the scope of the invention.

EXAMPLE 1

500 g a potassium silicate aqueous solution (30.0% solids content) having a 3.5:1 $SiO_2:K_2O$ mole ratio was put into a 1 l beaker, and placed on a heater equipped with a high-speed stirrer. While heating the beaker at 70° C. and stirring at 3,000 rpm, 161.4 g hydrosilica gel (33% solids content) was slowly added into the beaker to obtain a potassium silicate aqueous solution (25% solids content) having a 5.3:1 $SiO_2:K_2O$ mole ratio.

360 g of the prepared potassium silicate aqueous solution, 195 g graphite particles having an average particle size of about 2 μm, and 6 g carboxymethylcellulose (CMC) were added to 439 ml deionized water. The mixture was sufficiently mixed in a ball mill to form a conductive material. The conductive material was coated on the inner surface of a funnel of a CRT, dried, and sintered at 450° C. for 1 hour, so that a conductive layer was formed on the inner surface of the funnel.

EXAMPLE 2

A potassium silicate aqueous solution (25% solids content) having a 4.5:1 $SiO_2:K_2O$ mole ratio and a conductive material were prepared in the same manner as in Example 1, except that 89.66 g hydrosilica gel and 128.66 g deionized water were used with respect to 500 g potassium silicate aqueous solution having a 3.5:1 $SiO_2:K_2O$ mole ratio. A conductive layer was coated on the inner surface of a funnel of a CRT with the conductive material.

EXAMPLE 3

A potassium silicate aqueous solution (25% solids content) having a 5.3:1 $SiO_2:K_2O$ mole ratio and a conductive material were prepared in the same manner as in Example 1, except that 430 ml deionized water and 105 g graphite particles having an average particle size of about 2 μm were used, and 99 g $Fe_2O_3$ was further added. A conductive layer was coated on the inner surface of a funnel of a CRT with the conductive material.

EXAMPLE 4

A potassium silicate aqueous solution (25% solids content) having a 5.3:1 $SiO_2:K_2O$ mole ratio and a conductive material were prepared in the same manner as in Example 3, except that $TiO_2$, instead of $Fe_2O_3$, was added. A conductive layer was coated on the inner surface of a funnel of a CRT with the conductive material.

EXAMPLE 5

A potassium silicate aqueous solution (25% solids content) having a 5.3:1 $SiO_2:K_2O$ mole ratio and a conductive material were prepared in the same manner as in Example 3, except that SiC, instead of $TiO_2$, was added. A conductive layer was coated on the inner surface of a funnel of a CRT with the conductive material.

Comparative Example 1

500 g a potassium silicate aqueous solution (30.0% solids content) having a 3.5:1 $SiO_2:K_2O$ mole ratio was put into a 1 l beaker, and placed on a heater equipped with a high-speed stirrer. While heating the beaker at 40 C and stirring at 120 rpm, 145 g colloidal silica (20.5% solids content) was slowly added into the beaker. The mixture was continuously stirred for about 60 minutes until the mixture became transparent, so that a potassium silicate aqueous solution (27.9% solids content) having a 4.5:1 $SiO_2:K_2O$ mole ratio was obtained.

323 g of the prepared potassium silicate aqueous solution, 195 g graphite particles having an average particle size of about 2 μm, and 6 g CMC were added to 476 ml deionized water. The mixture was sufficiently mixed in a ball mill to form a conductive material. The conductive material was coated on the inner surface of a funnel of a CRT, dried, and sintered at 450 C for 1 hour, so that a conductive layer was formed on the inner surface of the funnel.

Comparative Example 2

A potassium silicate aqueous solution (25% solids content) having a 6.6:1 $SiO_2:K_2O$ mole ratio and a conductive material were prepared in the same manner as in Example 1, except that 277.93 g hydrosilica gel and 188.91 g deionized water were used with respect to 500 g potassium silicate aqueous solution having a 3.5:1 $SiO_2:K_2O$ mole ratio. A conductive layer was coated on the inner surface of a funnel of a CRT with the conductive material.

Characteristics of the conductive layers formed in Examples 1 through 5, and Comparative Examples 1 through 2, were evaluated by the following methods. The results are shown in Table 2.

(1) Specific Resistance

The conductive layers were tested for specific resistance using the four-wire method which was known as an effective method for a low-resistance sample. A 3540-mm home-Hi Tester (from HIOKI Co., Ltd.) was used to measure the specific resistance.

(2) Adhesiveness

Adhesiveness of the conductive layers was measured by the degree of lamination with an adhesive tape according to ASTM D3359 standard.

TABLE 2

| Example | Specific Resistance [cm] | Adhesiveness |
| --- | --- | --- |
| Example 1 | 0.04 | 100/100 |
| Example 2 | 0.04 | 100/100 |
| Example 3 | 0.37 | 100/100 |

TABLE 2-continued

| Example | Specific Resistance [cm] | Adhesiveness |
|---|---|---|
| Example 4 | 0.39 | 100/100 |
| Example 5 | 0.43 | 100/100 |
| Comparative Example 1 | 0.04 | 8/100 |
| Comparative Example 2 | 0.04 | 5/100 |

As shown in FIG. 2, the conductive layers formed in Examples 1 through 5 have satisfactory specific resistances, and have enhanced adhesiveness compared with the conductive layers of Comparative Examples 1 and 2. The specific resistances of the conductive layers of Comparative Examples 1 and 2 are almost the same as those of the conductive layers of Examples 1 through 5.

On the other hand, hot-evacuation temperature and time were measured for CRTs adopting the conductive layers of Examples 1 through 5, and Comparative Examples 1 and 2. As a result, for the CRTs adopting the conductive layers of Examples 1 through 5, the hot-evacuation time can be shortened, even at a low-evacuation temperature, compared with the CRTs having the conductive layers of Comparative Examples 1 and 2. In addition, the CRTs having the conductive layers of Examples 1 through 5 can be evacuated to a high vacuum level under the same processing conditions as applied in conventional CRT manufacturing method. Due to excellent adhesiveness of the conductive layer according to the present invention to the funnel of a CRT, lifetime of the CRT becomes longer.

As previously described, the conductive material according to the present invention, which is applied to form a conductive layer on the funnel of a CRT, uses potassium silicate dispersed in an aqueous dispersion medium with a $SiO_2:K_2O$ mole ratio in the range of 4.5:1 to 6:1, as a binder, so that adhesiveness of the conductive layer markedly increases. Use of the potassium silicate as a binder decreases the amount of gas released during a hot-evacuation process. As a result, evacuation time can be shortened. In addition, a CRT having almost same quality as a conventional CRT can be produced even at a low-evacuation temperature. The lamination of the conductive layer by external vibration or impact can be effectively suppressed. Thus, lifetime of the CRT becomes longer with increased productivity of the CRT.

What is claimed is:

1. A method of preparing a liquid composition comprising silicon dioxide and potassium oxide, the method comprising:
   providing an aqueous solution of potassium silicate comprising silicon dioxide and potassium oxide;
   stirring the aqueous solution with a stirrer at a rotational speed from about 500 rpm to about 5,000 rpm;
   adding hydrosilica gel to the aqueous solution while stirring so that the mole ratio increases beyond about 4.5 without resulting in gelation of the composition.

2. The method of claim 1, wherein the aqueous solution before adding hydrosilica gel has a mole ratio of the silicon dioxide to the potassium oxide smaller than about 4.5.

3. The method of claim 2, wherein the mole ratio before adding hydrosilica gel is from about 1.0 to about 4.0.

4. The method of claim 3, wherein the mole ratio before adding hydrosilica gel is from about 2.0 to about 3.5.

5. The method of claim 1, wherein when adding the hydrosilica gel the aqueous solution is at temperature from about 40° C. to about 100° C.

6. The method of claim 5, wherein the temperature is from about 55° C. to about 85° C.

7. The method of claim 6, wherein the temperature is from about 65° C. to about 75° C.

8. The method of claim 1, wherein the rotational speed is from about 900 rpm to about 4,000 rpm.

9. The method of claim 1, wherein the rotational speed is from about 1,100 rpm to about 3,500 rpm.

10. The method of claim 1, wherein the addition of the hydrosilica gel comprises continuously feeding the hydrosilica gel.

11. The method of claim 1, further comprising adding a dispersing agent.

12. The method of claim 1, further comprising adding a conductor.

13. The method of claim 12, wherein the conductor comprises at least one selected from the group consisting of graphite and carbon black.

14. The method of claim 12, wherein the conductor comprises graphite and at least one additional conductive material, wherein the graphite is included in an amount from 20 to 80 parts-by-weight with reference to 100 parts-by-weight of a total amount of the conductor.

15. The method of claim 1, further comprising adding a metallic compound to the aqueous solution.

16. The method of claim 15, wherein the metallic compound is selected from the group consisting of indium tin oxide (ITO), tin oxide ($SnO_2$), zinc oxide (ZnO), copper oxide (CuO), cobalt oxide (CoO), nickel oxide (NiO), chromium (Cr), chromium trioxide ($CrO_3$), manganese oxide (MnO), magnesium oxide (MgO), aluminum oxide ($Al_2O_3$), titanium oxide ($TiO_2$), silicon carbide (SiC), ferric oxide ($Fe_2O_3$) and mixtures thereof.

17. A composition comprising potassium silicate dissolved in water, wherein the composition is produced by a process comprising:
   providing an aqueous solution of potassium silicate comprising silicon dioxide and potassium oxide with a mole ratio of the silicon dioxide to the potassium oxide smaller than about 4.5; and
   mixing hydrosilica gel with the aqueous solution, so that the mole ratio increases beyond about 4.5 without resulting in gelation of the composition.

18. The composition of claim 17, wherein the process further comprises stirring the aqueous solution at a rotational speed from about 500 rpm to about 5,000 rpm.

19. The composition of claim 17, wherein the mixing comprises adding the hydrosilica gel to the aqueous solution while being stirred.

20. The composition of claim 17, wherein the process further comprises heating the aqueous solution to a temperature from about 40° C. to about 100° C.

21. The composition of claim 17, further comprising a conductor.

22. The composition of claim 21, wherein the conductor is selected from the group consisting of graphite particles, carbon black and a mixture thereof.

23. A cathode ray tube comprising an interior surface and a conductive layer on at least part of the interior surface, wherein the conductive layer comprises the composition of claim 21.

24. The composition of claim 17, further comprising a metallic compound selected the group consisting of indium tin oxide (ITO), tin oxide ($SnO_2$), zinc oxide (ZnO), copper oxide (CuO), cobalt oxide (CoO), nickel oxide (NiO), chromium (Cr), chromium trioxide ($CrO_3$), manganese oxide (MnO), magnesium oxide (MgO), aluminum oxide ($Al_2O_3$), titanium oxide ($TiO_2$), silicon carbide (SiC), ferric oxide ($Fe_2O_3$) and mixture thereof.

25. The composition of claim 17, further comprising a dispersing agent selected from the group consisting of carboxymethylcellulose (CMC), acryl, ethylene glycol and mixtures thereof.

26. The composition of claim 17, wherein the composition has adhesiveness of 3B to 5B tested under ASTM D3359.

* * * * *